United States Patent [19]
Adsett

[11] 4,447,831
[45] May 8, 1984

[54] METHOD AND APPARATUS FOR ENCODING GRAPHICS

[75] Inventor: David E. Adsett, Charlton Kings, England

[73] Assignee: Allied Corporation, Morris Township, Morris County, N.J.

[21] Appl. No.: 370,899

[22] Filed: Apr. 22, 1982

[30] Foreign Application Priority Data

Jul. 24, 1981 [GB] United Kingdom ............... 8122250

[51] Int. Cl.³ ............................................. H04N 1/40
[52] U.S. Cl. .................................... 358/283; 358/260; 358/280
[58] Field of Search ..................... 358/260, 280, 283

[56] References Cited
U.S. PATENT DOCUMENTS 4,366,506 12/1982 Ejiri et al. ........................... 358/280

FOREIGN PATENT DOCUMENTS 2025730 1/1980 United Kingdom ............... 356/283

Primary Examiner—Joseph A. Orsino, Jr.
Attorney, Agent, or Firm—Joel I. Rosenblatt

[57] ABSTRACT

A method of encoding information from a scanned original, for example in the production of halftone pictures by producing a video signal indicative of the original information, comparing it with a screen dot pattern to produce a series of signals which may have weighted values for separate sub areas within the screen dot area to form values representing the information for each of the original sub areas and combining the weighted values according to a predetermined function so that an encoded signal is produced indicative of the modulated distribution of the information of the sub areas of the pattern.

18 Claims, 15 Drawing Figures

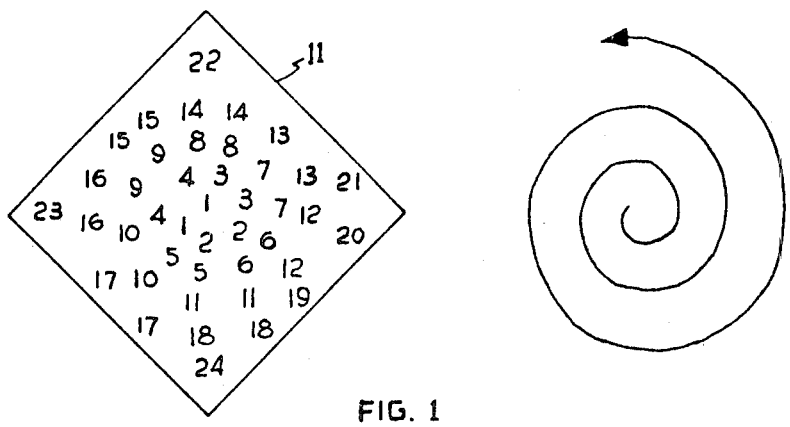
FIG. 1
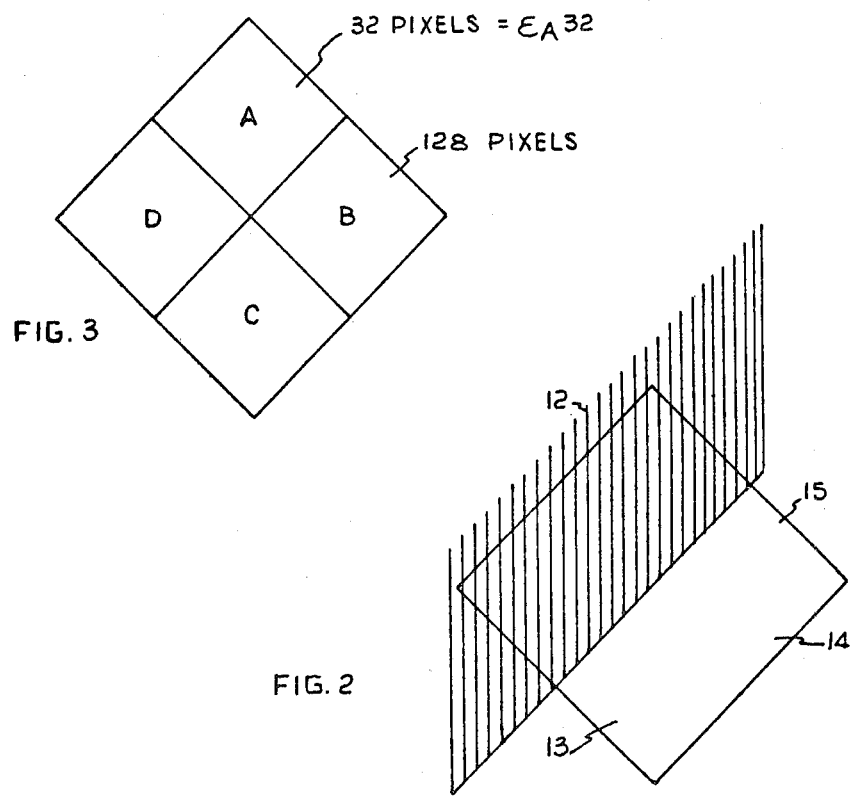
FIG. 3
FIG. 2

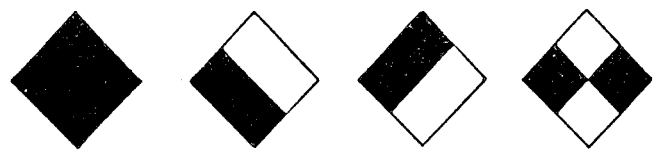
$S = A+B+C+D$
$T = A-B-C+D$
$V = A+B-C-D$
$U = A-B+C-D$
FIG. 4a
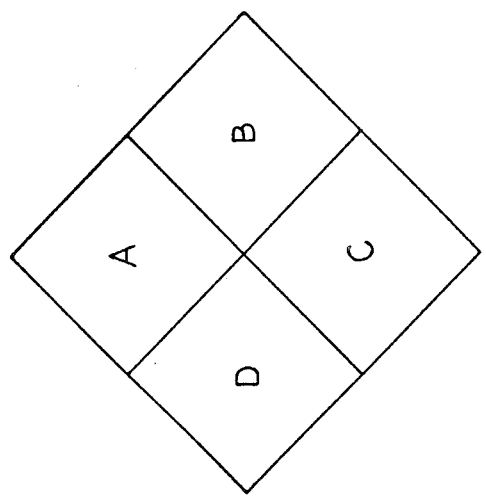

| CODE | HALFTONE SET | |
|---|---|---|
| 01-3F | UNMODULATED DOTS | |
| 41-4F | 0° MODULATION | |
| 51-5F | 45° MODULATION | |
| 61-6F | 90° MODULATION | |
| 71-7F | 135° MODULATION | |
| 81-8F | 180° MODULATION | |
| 91-9F | 225° MODULATION | |
| A1-AF | 270° MODULATION | |
| B1-BF | 315° MODULATION | |
| C1-C7 | HORIZONTAL MODULATION BLK. ON WHITE | |
| C9-CF | HORIZONTAL MODULATION WHITE ON BLK. | |
| D1-D7 | VERTICAL MODULATION BLK. ON WHITE | |
| D9-DF | VERTICAL MODULATION WHITE ON BLK. | |
| E0-FF | CONTROL CODES | |

FIG. 6

LINEWORK CHARACTER SET

| 00-0F | QUADRANTS + BLACK + WHITE |
| --- | --- |
| 10-40 | NOT USED |
| 41-47 | 0 MODULATION |
| 49-4F | 22.5° MODULATION |
| 51-57 | 45° MODULATION |
| 59-5F | 66.5° MODULATION |
| 61-67 | 90° MODULATION |
| 69-6F | 112.5° MODULATION |
| 71-77 | 135° MODULATION |
| 79-7F | 157.5° MODULATION |
| 81-87 | 180° MODULATION |
| 89-8F | 202.5° MODULATION |
| 91-97 | 225° MODULATION |
| 99-9F | 247.5° MODULATION |

FIG. 6a

| CODE | LINEWORK CHARACTER SET CONTINUED | |
|---|---|---|
| A1-A7 | 270° MODULATION |  |
| A9-AF | 292.5° MODULATION |  |
| B1-B7 | 315° MODULATION |  |
| B9-BF | 337.5° MODULATION |  |
| C1-C7 | HORIZONTAL MODULATION BLK ON WHITE |  |
| C9-CF | HORIZONTAL MODULATION WHITE ON BLK |  |
| D1-D7 | VERTICAL MODULATION BLK ON WHITE |  |
| D9-DF | VERTICAL MODULATION WHITE ON BLK |  |
| EØ-FF | CONTROL CODES | |

METHOD AND APPARATUS FOR ENCODING GRAPHICS

FIELD OF THE INVENTION

Scanning and reproduction of graphics, and particularly the encoding of the scanned signals for the selection of character words having patterns which are reimaged to substantially duplicate the original.

BACKGROUND OF THE PRIOR ART

The prior art includes many examples of devices for scanning an original to produce video signals, quantizing the video signals for a selected area of the original corresponding to a stored dot pattern and then storing those quantized signals for later reproduction. Such examples of the prior art are shown in U.S. Pat. Nos. 4,080,634 of Schreiber and 4,122,496 of Childress et al. Additionally, the quantized signals indicative of the selected areas are used to select a dot pattern, for reimaging, according to the distribution of the information in a particular area of the original. Such an example is shown in U.S. Pat. No. 4,150,400 of Wong. Additional examples for combining the various quantized signals produced over a dot pattern are as shown in U.S. Pat. No. 4,051,536 to Roetling and U.S. Pat. No. 3,806,641 to Crooks where dot pattern character words are stored for reproduction of the original.

The prior art shows means for comparing a stored dot pattern with an area on an original represented by the video signals for picture elements (pixels) within that area, and then using that information either directly or by combination, to reproduce the image, either through its original quantized values or by encoding to select a substantially similar halftone pattern character word from a memory. However, the prior art does not show a method of encoding the quantized signals into a signal such as a binary word capable of separately identifying the modulation of the information distribution across a dot pattern. It further does now show the use of such a binary word to select a dot pattern having a modulated information distribution imitating the scanned and quantized digital values for a corresponding pattern area on the original.

SUMMARY OF THE INVENTION

In the following discussion of the invention, the term dot pattern refers to a dimensionless grouping of electronically stored signals, each signal related to a pixel (picture element) within that dot pattern, and a threshold value which is used to quantize the video signal. The total screen dot pattern is juxtaposed electronically with an area in the original so that the totality of the video signals in the area corresponding to all the pixels in a screen dot pattern are quantized according to the threshold values for each respective pixel in the screen dot pattern.

The term dot used in the application does not refer to a physical dot as the arrangement of pixel threshold values in the screen dot pattern may be random and may be chosen to be any desired shape such as round, square, triangle or any other suitable regular or irregular shape.

Consistent with the principles of the invention, the stored screen dot pattern is used to quantize the video signals from a series of picture elements in the original, and corresponding to an area of the original electronically juxtaposed with the screen dot pattern. As is known in the art, this juxtapositioning of screen dot pattern with the original is repeated for other areas of the original.

The stored screen dot pattern is divided into a plurality of subareas.

The quantized signals corresponding to each subarea of the screen dot pattern are weighted as shown in the preferred embodiment by summing the quantized signals for each of the subareas. However, any other suitable methods for weighting the quantized signals in each subarea can be chosen consistent with the principles of the invention, such as averaging for example.

The weighted values for each subarea, then provide an indication of the information content in the original corresponding to the subarea of the juxtaposed screen dot pattern.

The weighted values for each of the subareas are then combined according to several functions which provide an indication of the modulated distribution of the information within the juxtaposed screen dot pattern.

The weighted values for each of the subareas are then combined according to several functions which provide an indication of the modulated distribution of the information. The functions are chosen to provide an indication of the angular modulation of the information over the juxtaposed screen dot pattern, and the amount of information over the screen dot pattern, and is used to produce a signal such as binary word indicative of these two quantities for line graphic, halftone and line rule information.

The results of combining the subarea values according to the specified functions produce a binary word which is then used to select a screen dot pattern from a memory location. That screen dot pattern is then used to cause an imaging device to produce an image of the stored and selected screen dot pattern corresponding to the original area.

Separate memory areas can be used for the screen dot pattern word corresponding to the line graphic, halftone and line rule functions as will be explained.

In the preferred embodiment, the screen dot pattern used for quantizing subsequent to scanning is divided into four subareas. Predetermined functions are used to combine selected subareas comprised by selected parts of the pattern. The selected subarea parts as shown in the preferred embodiment may or may not overlap.

A first function T combines a subarea with the adjacent and opposite subareas of the screen dot pattern to produce a functional value which indicates an angular modulation of the information along a first direction of the screen dot pattern, such as in the direction of the subarea and the first adjacent subarea. A second function V combines the subarea with a second adjacent subarea to produce a functional value indicating the degree of angular modulation in the direction of the subarea and the second adjacent subarea.

The values of these functions vary with the degree of angular modulation of the information in the dot pattern and these two functions may be compared with a threshold value indicative of an angle to determine the angular modulation of the information in the juxtaposed screen dot pattern.

In particular, the first function T sums the subarea with a first adjacent subarea and subtracts a second adjacent subarea and the opposite subarea. The second function V sums the subarea with the second adjacent subarea and subtracts the first adjacent subarea and the opposite subarea.

The functional added values are compared with a set of one or more threshold values. Two or more threshold values may be arranged with an angular difference corresponding to the angular modulation resolution desired. In the preferred embodiment, the angular separation of the threshold is 45°. Consistent with the preferred embodiment, two thresholds are placed at $+22\frac{1}{2}$ degrees (th) and $-22\frac{1}{2}$ degrees ($-$th). Each of the functions T and V is then compared with the thresholds th and $-$th and a series of logic signals are produced $T+$, $T-$, $V+$, $V-$ depending upon the relationship of T and V to the thresholds. The logic states of $T+$, $T-$, $V+$ and $V-$ are then encoded to produce a binary word indicating the angular modulation of the juxtaposed area.

The number of angular thresholds may be increased to increase the resolution of the angular modulation definition.

Further, the weighted quantized signals for each subarea are combined according to a function S wherein the subareas are summed to produce an indication of the total amount of information in the screen dot pattern.

A fourth function U is used, where information is within the screen dot pattern and partially centered over the screen dot pattern. This is indicated when the weighted quantized signals for a set of opposite subareas along a first axis have a different added value than the combined quantized signals for a set of separate and distinct opposite subareas along a second axis. In this case, the information is balanced about an axis passing through one set of subareas. The information however, would not be balanced with respect to all radial lines from the center of the dot pattern, and the total information for the separate and distinct opposite subareas along the second axis is less than the information for the first set of opposite subareas and through which the said axis passes.

This is typically the case for a line rule which may pass through the center of a juxtaposed screen dot pattern and diagonally from one corner to another corner of the screen dot pattern.

The angular modulation derived from the functional values T and V is then encoded into a binary word which provides eight possible indications of an angle in 45° steps. In the case of line graphics and halftones, a binary word represents the amount of modulation, "S". The binary words are combined to form an 8-bit word which is then used to address a memory location containing a screen dot pattern for reimaging as is well known.

The same 8-bit word can be used to select different screen dot patterns from either a line graphic memory, or a separate halftone memory. Additionally, for the function U, where T and V are substantially close to zero, and where U has a value substantially above zero or below zero, another memory may be selected using the same 8-bit word. However, only where fewer bits are needed to encode the angle modulation, the unused bits may be used to indicate the amount of modulation, to a finer degree.

Accordingly, where the information is balanced over a juxtaposed screen dot pattern as in the case of a consistent halftone or where a black character or a white background covers the total dot pattern, then a third memory containing a fourth set of screen dot patterns may be accessed where the information is balanced about the center of the screen dot pattern and with zero angular modulation but where the amount of modulation may vary depending upon the amount of information in the original corresponding to the juxtaposed screen dot pattern.

It is known in the art to scan an original and produce a video signal, and then quantize that video signal according to a juxtaposed screen dot pattern, and to store said signals in memory for later reproduction in relation to the position of each of the quantized signals on the original.

This disclosure describes a method and apparatus for deriving quantized signals and weighting these quantized signals by combining them with respect to subareas in a juxtaposed scanning pattern and combining the weighted signal through several functions designed to provide an indication of the angular modulation and the amount of modulation of the original with respect to the juxtaposed screen dot pattern and to encode the modulation information in order to select a character word having a screen dot pattern substantially conforming to the angular modulation and the amount of modulation of the original area which can then be used to reproduce the original area.

DESCRIPTION OF THE DRAWINGS

FIG. 1 shows a screen dot pattern with values given for each pixel within the screened out pattern and the growth direction of the dot for increasing tones.

FIG. 2 shows a screen dot pattern superposed over graphic information.

FIG. 3 shows a screen dot pattern subdivided into subareas with the maximum value for the subarea and for the total screen dot pattern given.

FIG. 4a shows the modulation sensitivity of each of the S, T, U and V functions.

FIGS. 6, 6a and 6b show a number of stored patterns or characters reproducing graphic information.

DESCRIPTION OF THE PREFERRED EMBODIMENT

Figure 2A:
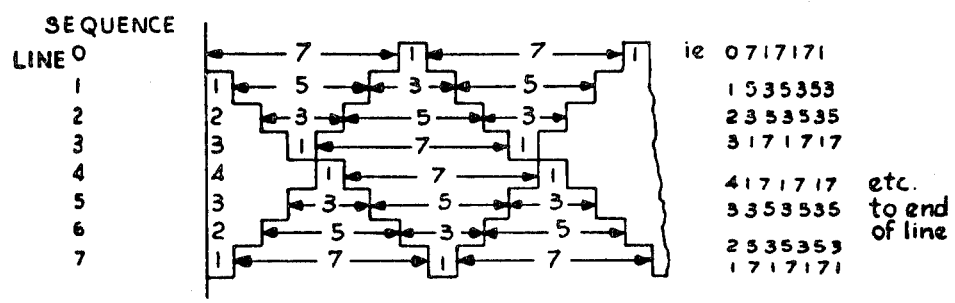
FIG. 2a shows a stored screen dot pattern for scanning an original.

In a scanning device, as is well known, an original is electronically analyzed or divided into discrete image areas, each area corresponding to a halftone dot pattern and with each dot pattern divided into picture elements or pixels.

An example of a screen dot pattern is shown in FIG. 1 and is divided into pixels. Each pixel is defined as an elemental scanned area with a threshold value. A number of pixels form the screen dot pattern. The pixels shown have the lowest threshold (1) in the center. The dot pattern example of FIG. 1 is one possible dot pattern which could be used, it being understood that other dot patterns could be used consistent with the inventive principles. A scanned video signal is compared with a respective pixel threshold value, and a first logic signal such as a binary 1 is stored where that video signal has a value less than a corresponding pixel value, and a second logic signal such as the binary zero is stored where that video signal has a value greater than the corresponding pixel value or visa versa.

The scanning pattern related to the dot pattern is dimensionless and which by a scanning rate or memory access rate is electronically made to correspond to an image area scanned on an original and then that pattern is repeated for successive and equal areas or may be varied as is well known in the art.

Such a stored scanning pattern may be as shown in 2a where each pixel in the pattern is referenced to a line and to its location in a respective dot pattern.

For example, line 0 starts with a pattern represented by a width of 7 pixels, followed by a second pattern represented by a width of 1 pixel followed by 7 pixels and representing the sequence 07171 ... as shown. Line 1 starts with a pattern represented by 1 pixel width followed by a second pattern of 5 pixels width, followed by a third pattern of 3 pixels width, followed by 5 pixels repeating the sequence 15353 .... The sequences for lines 2 to 7 are as shown with the dot patterns defined by the outlines shown. The pattern also contains pixel values for quantizing the scanned image areas on the original, corresponding to the pixel location.

As an image is scanned, the analogue video signal is quantized by comparing it with a respective pixel threshold value in the scanning pattern, and these values are stored for later reimaging.

For this as in most other screen dot patterns, the lowest threshold values are in the center with the largest threshold values being at the periphery of each dot pattern. In this way, a substantially white or very light gray area in the scanned original, corresponding to a respective dot pattern area will generate a series of binary one signals for the pixels closest to the center where the threshold values are the lowest. As the amount of information in the scanned area increases, the video signal will become progressively higher than the threshold values in the direction from the area center until a totally black scanned image will be quantized as a binary one for most pixels in the dot pattern.

In the case of line graphics, such as letters, the threshold and video gain are usually arranged so the information or black portion of the line graphic will produce binary ones and the white portion will produce binary zeros regardless of the threshold value of a pixel element. The information may be quantized as a series of binary one's for the area portion of the pattern corresponding to the information.

For example, as shown in FIG. 2, the line graphic black area shown by the crosshatch lines 12 covers half the entirety of the superposed screen dot pattern. In this case the uncovered, part including corners 13 and 15 would be represented by binary zeros while the balance of the screen dot pattern representing the information portion 12 of the line graphic would be represented by binary ones.

A screen dot pattern for quantizing the scanned original information, may be as shown in FIG. 3, where the dot pattern comprises a total of 128 picture elements or pixels, and the dot pattern is divided into subareas such as the four separate subareas, A, B, C and D shown in each comprising 32 pixels. The pixel threshold values for screen dot pattern can be random and arrange in any suitable pattern. However, for the purposes of explanation, we will assume it is a screen dot threshold pattern much like the one shown in FIG. 1 with the pixel threshold values increasing as the pixels progress towards the periphery of the dot pattern. A very small dot may be formed for a very light gray or white scanned area while a larger dot is formed for dark scanned areas. The pattern may be divided as shown into equal subareas.

As shown in FIG. 3, each subarea A, B, C and D may have 32 pixels, based upon a total 128 pixels. Assume the scanned original area corresponding to subarea A is sufficiently dark, and a quantized logic signal binary one will be produced when the video from that scanned area is compared with each pixel of subarea A. A weighted summation of logic signals for subarea A then would produce the maximum value of 32. This sum may be registered in a counter which is incremented for each binary one produced by a comparison of the scanned original with a respective pixel threshold value in the subarea.

The weighted sum for each subarea of the pattern will vary with respect to the information content of the original corresponding to that subarea.

A series of comparisons are made of one subarea to another within a dot pattern. The comparisons are made according to several functions which relate the weighted values of the subareas to the modulated distribution of the information over the pattern.

The information distribution over a pattern may vary and can be a modulated distribution relative to a reference location in the pattern such as the pattern center or to an angle. In graphics, the information may be of a uniform density as in the case of type, but cover only a portion of a pattern. This may be as seen in the example shown in FIG. 4 where the information (black) covers only 50% of the total pattern. However, the information may be modulated at different angles.

In the case of halftone, the tone of the information may be uniform over the pattern, or may vary equally in the radial direction from the dot pattern center or may be unevenly distributed, darker on one side of the pattern than on the other.

The areas in the original corresponding to dot patterns may contain information deviating from a reference in the pattern. The degree of deviation is the modulation of the information with information. This method is then used to detect the original information modulated distribution over each dot pattern and to encode that distribution. The code is then used to select a stored screen dot pattern substantially that of the original area information and to use that stored pattern to reproduce that area of the original.

When video from a scanned original is compared with a screen dot pattern, the quantized logic signals produced by that comparison as is known in the art are classified by dot pattern subarea and pixel location in the superposed dot pattern and the location of the area on the original.

As shown in FIG. 3, each subarea is arranged relative to the other subareas in the pattern. A single subarea, such as subarea A for example is arranged relative to a first adjacent subarea D and second adjacent subarea B and opposite subarea C. A series of functions S, T, U, V, are derived from the weighted values of the quantized signal of each subarea and the positional relationships of each subarea to another to detect the information modulation distribution over the pattern.

Figure 4:
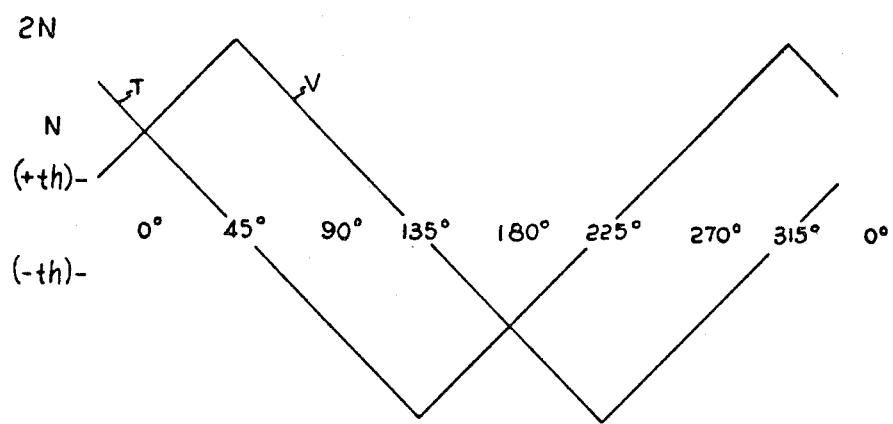
FIG. 4 shows the values for functions T and V for a screen dot pattern superposed on line graphic information, with a modulation amount of 50% and at various angular modulations.
Figure 4:
Figure 4:
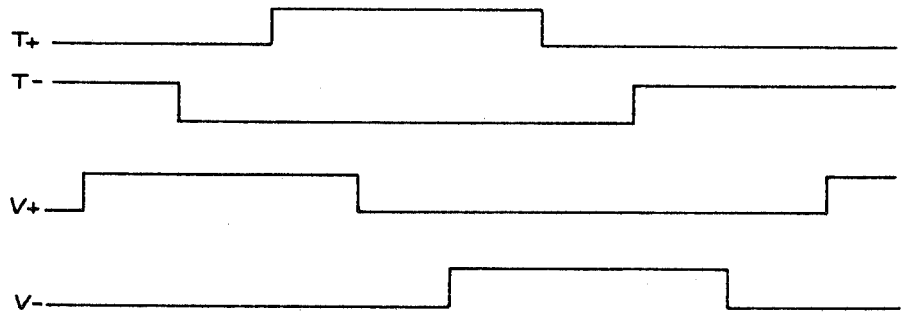
Figure 5:
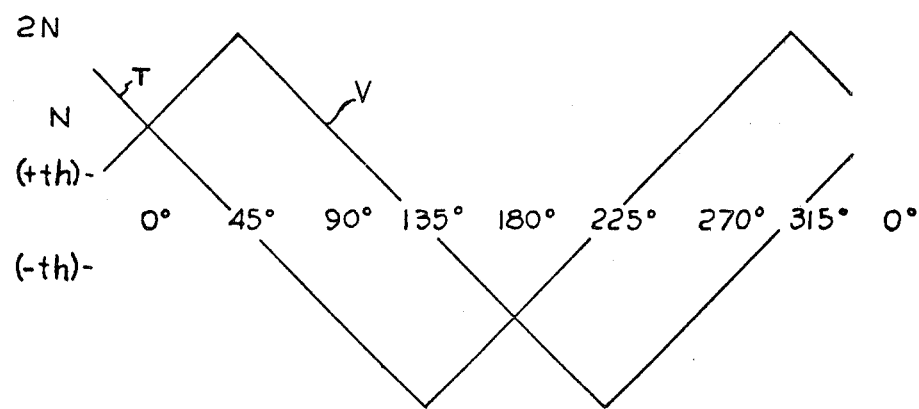
FIG. 5 shows the values for the T and V function for a screen dot pattern superposed on halftone information with a 50% modulation amount and at various angular modulations.
Figure 5:
Figure 5:
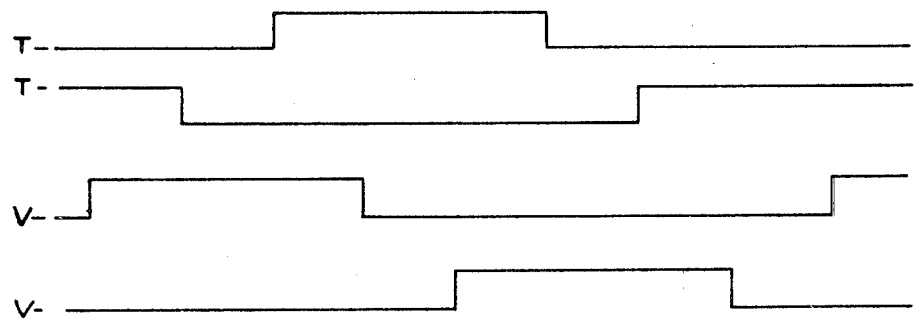
Figure 8:
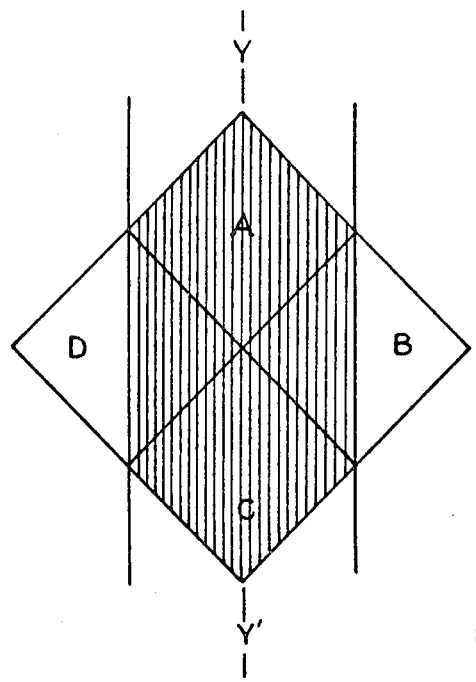
FIGS. 8 and 9 show the screen dot pattern superposed on a line symmetrical to first and second axes of the screen dot pattern.
Figure 9:
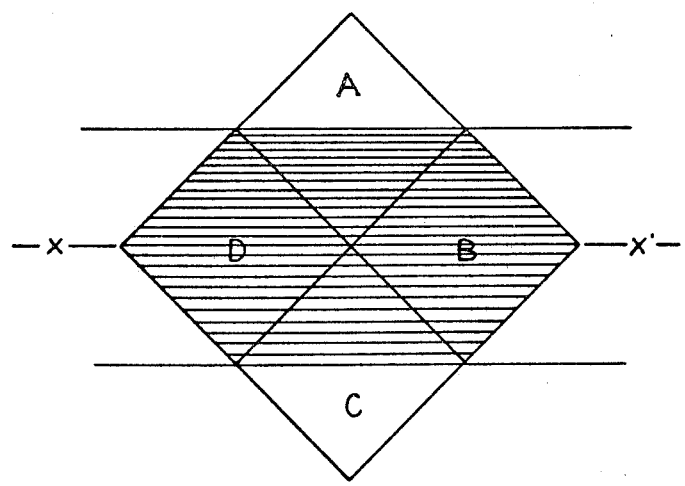

As seen, the functions chosen indicate the information content in selected parts of the dot pattern. Functions T and V are used to indicate the angular modulation of the information over the dot pattern, whether line graphics as shown in FIG. 4 or halftone as shown in FIG. 5. Function U is used to indicate a partially balanced information distribution where the information content may be balanced along one direction of the pattern. Function U could be used to detect, for example, information evenly distributed on each side of a diagonal through subarea D-B or on each side of a diagonal through subareas A-C. One such distribution would be a horizontal line or a vertical line and where width would be indicated by the function S, and as shown in FIGS. 8 and 9.

The functions ae represented as follows:

$$S = A + B + C + D$$

$$T = A - B - C + D$$

$$U = A - B + C - D$$

$$V = A + B - C - D$$

where A, B, C, D, are the weighted subarea values. These functions will have a maximum value for each respective information pattern shown in FIG. 4a. Each of the functions T and V can be plotted and can be used to represent the angle modulation of the line graphic or halftone information justaposed with the dot pattern.

As shown in the example of FIG. 4, an area of line graphic information is shown superposed on screen dot patterns 55, and occupies 50% of that area at different angular modulations. As shown, functions T and V change in value depending upon the angular modulation from 0° to 315°. Where the maximum value of each subarea A, B, C, or D is N, then for N information over each dot pattern subarea where $A = B = C = D$, $$S = A + C + D = 4N$$

$$T = A - B - C + D = 0$$

$$V = A + B - C - D = 0$$

For 0° angular modulation the function may be expressed in terms of N and, $$S = 2N$$

$$T = N$$

$$V = N$$

T and V have discrete values between 0° and 360°. For graphics covering 50% of the dot pattern, T is shown to have a maximum value 2N at 315° and minimum −2N at 135%, V is shown to have a maximum value 2N at 45° and minimum −2N at 225°.

Where the angular modulation of the information is to be defined, then suitable thresholds may be chosen to discriminate between the changing values of T and V, and to use the threshold crossing to identify the angular modulation.

As shown in FIGS. 4 and 5, where the angular modulation is identified in 45° increments, a set of threshold values may be defined for T and V spaced by a 45° increment. These thresholds may be as shown placed at $\theta = \pm 22.5°$.

In the preferred embodiment where the maximum value N of each subarea is 32, then as shown in FIG. 4 and FIG. 5 the maximum value of T and V is $(2N) = 64$. The thresholds would then be set at $th = N \tan(\pm \theta)$.

In the preferred embodiment the two thresholds are separated by 45° and are located at $22\frac{1}{2}$ degrees (th) and $-22\frac{1}{2}$ degrees (−th). These thresholds, th and −th, are compared with the functions T and V to determine the angularity of the line graphic, on a screen dot pattern.

In the preferred embodiment, a series of logic signals T+, t− and V+, V− are derived from T and V have discrete values between 0° and 360°. For graphics covering 50% of the dot pattern, T is shown to have a maximum value 2NA at 315° and minimum −2NA at 135%, V is shown to have a maximum value 2NA at 45° and minimum −2NA at 225°.

Where the angular modulation of the information is to be defined, then suitable thresholds may be chosen to discriminate between the changing values of T and V, and to use the threshold crossing to identify the angular modulation.

As shown in FIGS. 4 and 5, where the angular modulation is identified in 45° increments, a set of threshold values may be defined for T and V spaced by a 45° increment. These thresholds may be as shown placed at $\pm 22.5°$.

In the preferred embodiment where the maximum value N of each subarea is 32, then as shown in FIG. 4 and FIG. 5 the maximum value of T and V is $(2N) = 64$. The threshold is then set at N Tan.

In the preferred embodiment the two thresholds are separated by 45° and are located at $22\frac{1}{2}$ degrees (th) and $-22\frac{1}{2}$ degrees (−th). These thresholds, th and −th, are compared with the functions T and V to determine the angularity of the line graphic, on a screen dot pattern.

In the preferred embodiment, a series of logic signals T+, T− and V+, V− are derived from the functional values T and V respectively by quantizing the function values T and V with respect to the thresholds: th and −th.

As shown in FIGS. 4 and 5,

T+ is True for $T < -th$ and False for $T > -th$
T− is True for $T > th$ and False for $T < th$
V+ is True for $V > th$ and False for $V < th$
V− is True for $V < -th$ and False for $V > -th$ The values of T and V can be compared to the threshold values (th, −th) and the results of that comparison encoded to identify the angularity of the graphic information. This process is applicable to line graphics, as well as halftone or gray level information.

A comparison of T and V to the thresholds then may be used to produce discrete signals such as T+ and T−, and V+ and V−; T+ and T−, and V+ and V− being true or false (high or low) dependent on the angle of the graphic information across the pattern. According to one possible logic arrangement as used in the preferred embodiment:

T+ is true when T<−th T+ is false when T>−th
T− is true when T>th
T− is false when T<th
V+ is true when V>th
V+ is false when V<th
V− is true when V<−th
V− is false when V>−th The foregoing may be summarized in the truth table below:

|  | T+ | T− | V+ | V− |
|---|---|---|---|---|
| 0° | F | T | T | F |
| 45° | F | F | T | F |
| 90° | T | F | T | F |
| 135° | T | F | F | F |
| 180° | T | F | F | T |
| 225° | F | F | F | T |
| 270° | F | T | F | T |

Where F is a low or binary 0 and T is a high or binary 1, then the output T+, T−, V+, V− may be encoded, for example, to produce 3-bit word indicative of the angle as follows:

|  | Word |
|---|---|
| 0° | 000 |
| 45° | 001 |
| 90° | 010 |
| 135° | 011 |
| 180° | 100 |
| 225° | 101 |
| 220° | 110 |
| 315° | 111 |

Figure 6B:
Figure 6B:
Figure 6B:
Figure 6B:
Figure 6B:
Figure 6B:
Figure 6B:
Figure 6B:

The angular decoding steps are shown by way of example and may be expanded by increasing the number of thresholds or by expanding the functions by adding functions additional to T and V, or by changing the arrangement of bits as shown in FIGS. 6 6a, and 6b.

The value of S then can be used to define the amount of modulation given as;

$$S = A + B + C + D$$

and with a maximum value of N for each of the subareas A, B, C and D.

Where 8-bit bytes are to encode each dot pattern as shown in FIGS. 6a, 6b, 4-bits may be used to define the angle of modulation and 4-bits may be used to define the amount of modulation. The 8-bit word would then be used as an address in memory. The contents of that memory address would then be a screen dot pattern having an information distribution substantially that of the scanned area and corresponding to a respective character.

Each stored dot pattern used for reproduction would then be a set of digital values for each pixel, the dot pattern corresponding to the information to be reproduced.

For example, where the 50% pattern at 0° of FIG. 4 was to be reproduced, then the stored dot pattern character shown in FIG. 6 for byte 41–47 would be selected and with binary 1's and 0's of the stored character controlling the reproduced information content for each pixel in the dot area. Any known reproducing means could be used, as for example a CRT or laser-electrophotographic system with the radiated beam controlled relative to its position and the respective pixel values (1 or 0) at each respective location, as is well known.

The principles of the invention are equally applicable to halftones. As shown in FIG. 5, 50% covered dot areas 55 are shown for gray tones. To further illustrate the invention, the gray tones are shown unbalanced over the dot area with the darker tone on one side of the area. The total range as shown may occur in graphics when scanning a halftone picture such as containing alternate light and shadow and where the scanned video represents transitions in gray tone. The dot areas 55 of FIG. 5 then represent such transitions and particularly an unbalanced content over the juxtaposed dot area with one side of the dot area darker than the other side.

In line graphics or halftones, where the information is constant along radial lines from the center of a dot, then T=0, V=0, and no angular modulation is indicated. Where the density of the tones is distributed unequally over the subareas A, B, C, D, then T=0, and V=0 and the functional values can be encoded to indicate the angular modulation.

Figure 7:
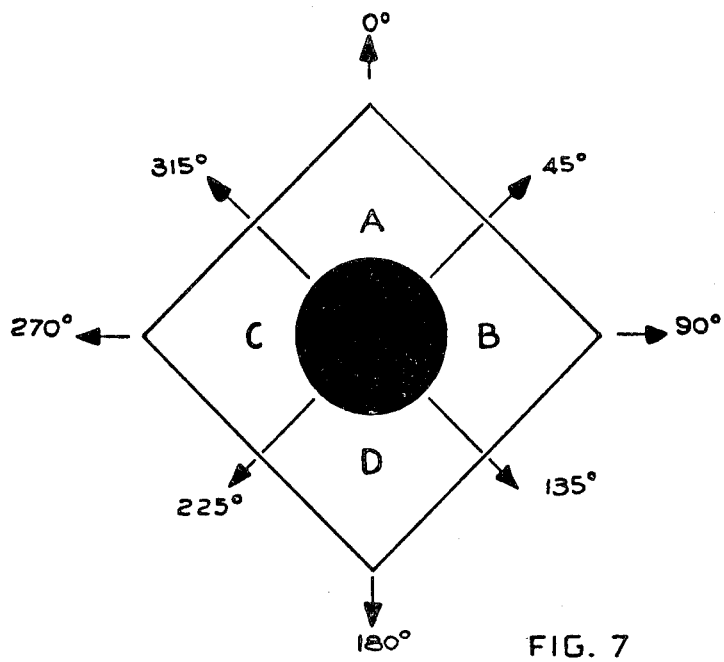
FIG. 7 shows a halftone pattern with different directions of angular modulation.

In the case of halftones as shown in FIG. 7, the stored dot pattern addressed would have a dot modulated consistent with the scanned pattern. The memory then would contain a series of dot patterns displaced along the angular axes 0° to 315° (FIG. 7 and FIG. 6) corresponding to the function S indicative of the scanned information amount.

Dot patterns also would be stored as is well known with the black area or dot centered in the pattern, (FIG. 7). Such a dot pattern would be selected where T=0, V=0, and with a dot size corresponding to the amount of information in the original area.

Where the information was not evenly distributed, then T=0 and V=0, would be compared to the selected thresholds to determine the degree of angular modulation as in the case of FIG. 4 and with the amount of modulation given by the functional value S.

The eight bit words shown in FIGS. 6, 6a, 6b would then be used to address a stored dot pattern with the dot appropriately displaced along one of the axes 0, 45, 90, 135, 180, 225, 270, or 315 degrees indicated by T+, T−, V+ and V−, and with a dot size indicated by S.

Additionally, a further function U=A−B+C−D is used to define an information distribution centered about one axis through the pattern such as X-X' or Y'Y and as shown in FIG. 8 and 9.

The function U combines the quantized values for first opposite subareas, and compares that sum to the sum of second opposite subareas. In the case of the preferred embodiment, positive value indicates a pattern centered about one axis and a negative value indicates a pattern centered about a second axis.

Typically, a pattern such as in FIGS. 8 and 9 would produce function values where T and V approach 0. Any comparison between between T and V and a threshold level could then be used to indicate the occurrence of a "U" pattern centered about an axis through the pattern such as a line and S would then indicate the width of the line.

Figure 10:
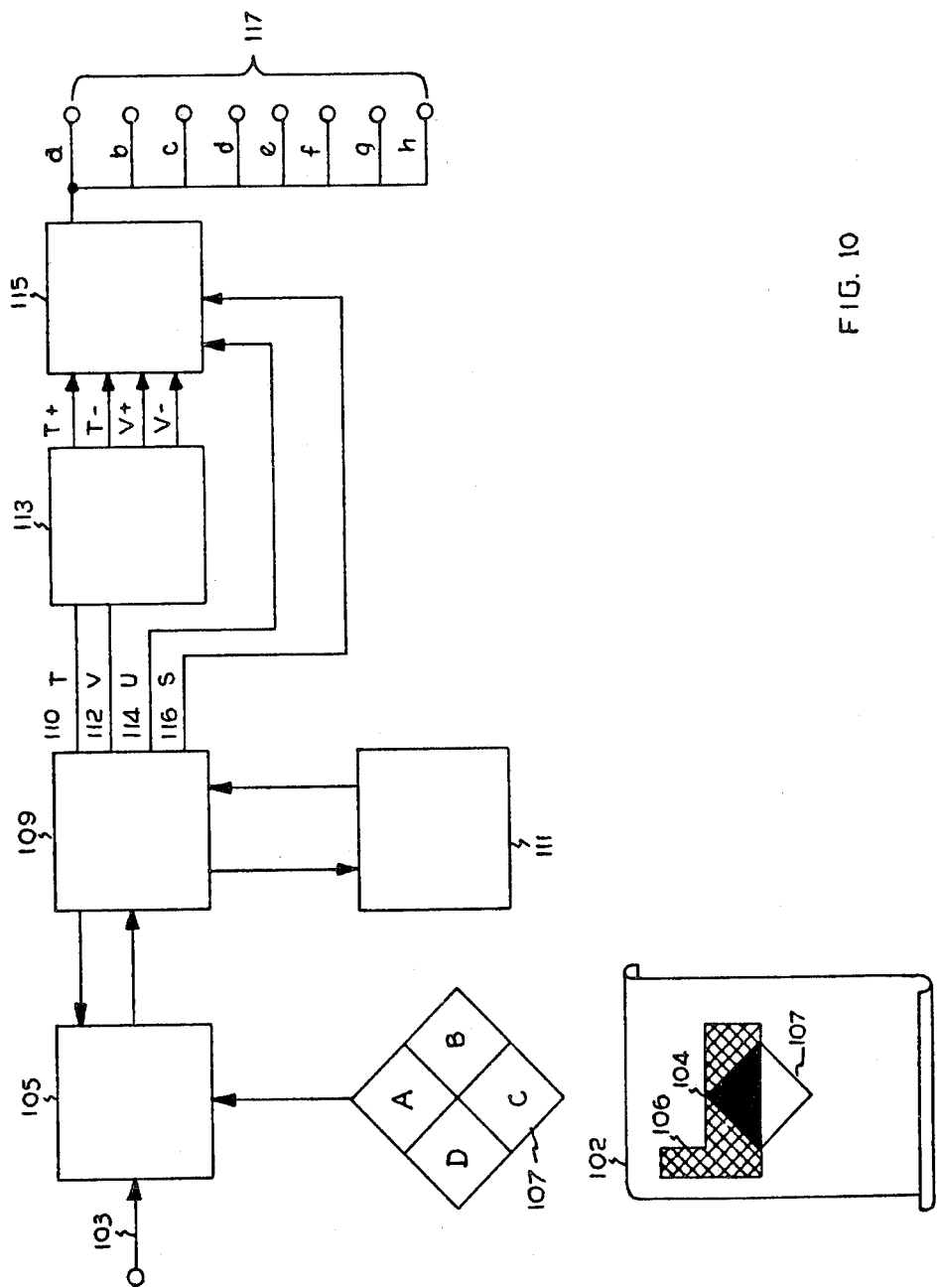
FIG. 10 shows in block form, a system for scanning an original in relation to superposed screen dot patterns and then forming a binary code word identifying a screen dot pattern corresponding to an original image area superposed with the pattern.
Figure 11:
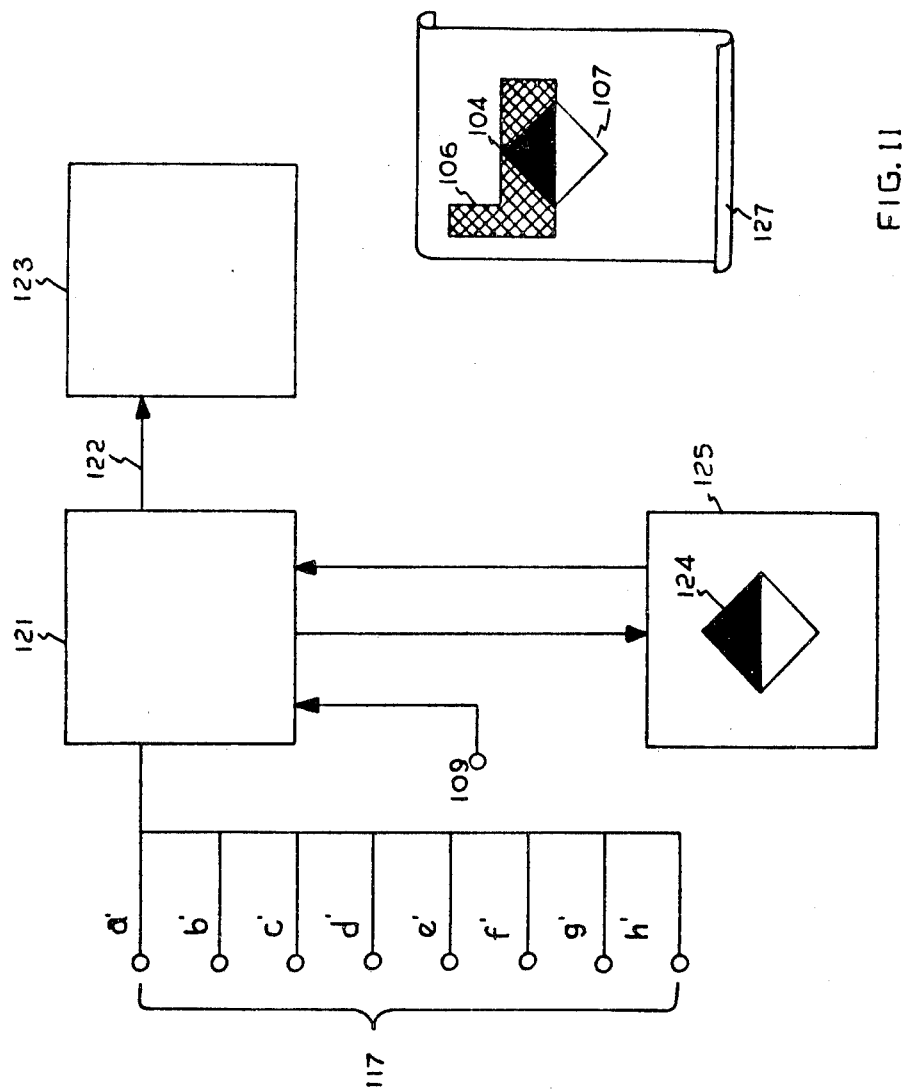
FIG. 11 shows a device for receiving the binary code word corresponding to a stored halftone patterns and then reimaging that halftone pattern to reproduce the corresponding original area.

A system for carrying out the principles of the invention is shown in FIGS. 10 and 11.

As shown, an original 102 containing information 106 is scanned to produce a video signal 103. A dot pattern 107 is shown symbolically juxtaposed over the original 107 and information 106 for the purposes of explanation. As is well known in the art, the video signals appearing on line 103, indicative of the original information content such as the information under dot pattern 107, is produced pixel by pixel. These video signal levels for the portion of the original 102 corresponding to the dot pattern 107 is quantized according to the threshold values of the pixels in the dot pattern.

As shown, the portion of the original 107, identified as the information area 106 and corresponding to the dot pattern 107 is shown as 104 (the top half of the dot pattern 107).

The dot pattern 107 is an electronically stored dot pattern as shown for example in FIG. 1 and is juxtaposed with the scanned video image by suitable timing under control of a microprocessor 109 as shown in FIG. 2a. A processor such as a Signetics 8X300 computer, may be used, as is well known in the art. As shown, the juxtaposition of the dot pattern 107 with the original 102 is done electrically and the quantized stored values produced represent the dot pattern shown 107 juxtaposed upon the original 102. The distribution of the information 106 over the dot pattern 107 is with an angular modulation of zero degrees and with an amount modulation of 50%. As will be recognized, if the electronic juxtaposition of the screen dot pattern 107 with the information 106 on the original 102 were to change by movement of the screen dot pattern 107 downwardly, the percentage of the information covering the screen dot pattern would decrease if the screen dot pattern was electronically moved upwardly, the percentage of coverage would then increase, changing the modulation amount. Additionally, if the screen dot pattern 107 was rotated electronically about its center, the angular modulation would change from 0° to a different angle.

As shown, the video signal 103, is connected to a means 105 which quantize the video signal in relationship to the pixel values within the screen dot pattern 107 as is well known in the art. The screen dot pattern 107 may be stored in memory store 111, which may be a bipolar ROM and supplied to the quantizing means 105 by processor 109, and which then may receive the quantized values and either store them in relation to the location of each of the values on the original 102 and their respective positions in the electronically juxtaposed screen dot patterns, as is well known in the art.

Processor 109 may be any suitable processor such as the Signetics 8X300 which can weigh and combine the quantized values to produce signals T, V, U, and S on output terminals 110, 112, 114 and 116 respectively.

Signals T and V are then provided to a discriminator 113 which compares T and V to a suitable threshold to determine the angular modulation of the dot pattern as indicated by T and V. T+, T−, V+ and V− are logic signals produced by the comparison of T and V as shown in FIGS. 4 and 5 with the thresholds (th −th). The discriminator may be a digital computer such as the 8X300 or a suitable analog device.

As shown, in the exammple of the preferred embodiment function T is representative of an angular modulation along a first axis, passing between subareas A-D and B-C while function B is representative of angular modulation of the information along an axis passing between subareas A-B and B-C. A third function U is sensitive to angular modulation along an axis passing between the center of the dot pattern and subareas A and C or along an axis passing between the center of the dot pattern and through subareas D and B.

Any angular modulation of the dot pattern by the juxtaposed information produces an imbalance in the functional value T, and V so that T, and V are not equal to zero. The comparison of the functions T and V then can be used to produce an indication of the angular modulation while analysis of the function U can be used to produce an indication of any symmetry along any of the said axes passing through the center, and through opposite subareas as shown in FIG. 4a.

The functions T and V are then provided to the said discriminator 113 which provides signals T+, T−, V+ and V− dependent upon the comparison of the separate functions T and V with the thresholds chosen.

In this case, where an indication of angular modulation is desired in the steps of 45°, a threshold pair (th, −th) is established separated by 45° and arranged at $+22\frac{1}{2}$ and $-22\frac{1}{2}°$. As the angular modulation of the screen dot pattern changes, as shown, the values of the T and V will change, T and V either being on one side of a threshold or the other and passing through this threshold at selected points as shown in FIGS. 4 and 5.

The output for the discriminator 113 shown as T+, T−, V+, V− is produced as shown at terminal 117 by encoder 115. These encoded values are shown in the Truth Table for the values of T+, T−, V+ and V−. However, it should be understood that the functions T, U, V and S can be altered as can the thresholds to produce a different Truth Table and different modulation patterns consistent with the principles of the invention.

Encoder 115 encodes each of the combinations of T+, T−, V+, V− shown on page 13, the S and U functions and produces an 8-bit code for the character set. The character set comprises a plurality of 8-bit codes, each code representing a respective pattern for reproducing a halftone or line graphic. The various codes and character set patterns are shown in FIGS. 6, 6a, and 6b.

The Signetics 8X300 is used to encode the 8-bit words of FIGS. 6, 6a and 6b, responsive to the T, U, V and S function values. Programs for accomplishing the 8-bit coding are shown in the Appendix.

The means for reproducing the scanned image is shown in FIG. 11, and as shown, terminal 117' includes terminals a', b', c', d', e', f', g', and h', corresponding to terminal 117 in FIG. 10. The word appearing on terminals 117' is then provided to a decoder 121 under control of processor 109 along with a control signal from processor 109 indicative of the dot pattern locations in the original corresponding to the word appearing on terminal 117'. That information may be used to access a stored dot pattern in memory 125, representing a character in the character set, such as shown in FIG. 6 and as represented by 124, which may be transmitted on line 122 to any suitable image reproducer 123 to reproduce the original.

Memory 125 contains a series of character words, each character word being a dot pattern having a respective angular modulation and amount modulation.

The character set shown in FIG. 6 is used in the preferred embodiment and the set may be expanded or contracted within the principles of the invention. The characters each have an identifying code of two 4-bit bytes given in hexadecimal. This code may be used to access a desired character from memory, which would then control the image reproducer 123. For any particular angle modulation, such as 45° modulation, the set includes a number of characters at different modulation amounts. Each particular character would then have a code within the code range such as 51-5F indicating 45° degree modulation and the modulation amount for the particular character. The most significant bits in the 4-bit byte can be coded as shown to indicate angular modulation as well as the type of character such as halftone line work, horizontal or vertical modulation or control codes.

As shown, a representative dot pattern 124 having 0° angular modulation and 50% amount modulation is shown representative of the modulated information content 106 with the dot pattern 107 in FIG. 10. These character words may be stored in the memory at locations addressed by the 8-bit word appearing on terminals 117. The pixel values appearing at the address location corresponding to the word on terminal 117' would then be used by reproducing means 123 to reproduce the image on printing surface 127. The stored value may be similar to a character shown in FIG. 6, such as 41-47, imaging the information corresponding to the information area 106, juxtaposed with dot pattern 107 in the upper half of the dot pattern 107 shown as 104.

As is well known in the art, suitable programming can be arranged to correlate the location of each pixel in an electronically stored dot pattern, with the video signal derived from an original, and the location of the derived video of an area with the character word and the dot pattern used to reimage the original area on a printing surface 127.

This invention is directed to a manner of encoding quantized scanned video information according to a screen dot pattern and using that encoding to select a modulated dot pattern indicative of that information content juxtaposed with the dot pattern. The scheme advantageously uses a variety of stored screen dot patterns for reimaging with modulated information distribution substantially that of the original. In this way, an original can be scanned, quantized, and reproduced more merely identical to the information appearing on the original.

As is well known, while the principles of the invention are directed for quantizing the video signal produced by scanning an original according to a screen dot pattern, and comparing the quantized signal according to subareas of the screen dot pattern to indicate the angular modulation and the amount of modulation of the information across the juxtaposed screen dot pattern, many variations of the number and position of the subareas can be chosen. Four of said subareas with the quantized signal values for each subarea summed is shown in the preferred embodiment as the best mode for using the invention. However, it will be recognized that many variations of the number of subareas chosen as well as the comparison of the subareas can be used as would best fit the type of dot pattern used to quantize the video signal, and the resolution of percent coverage modulation desired.

In scanning an original, the information content within image areas on a line may be scanned and the content of those images encoded into an electronic signal. As stated before, these image areas can be the size of a screened dot pattern or they can be elemental or pixel size image areas.

According to the preferred embodiment these areas are screened dot pattern areas and are encoded with a binary word indicative of the amount of modulation and the angular modulation of each particular area. Additionally, the location on the orginal of each of the areas is also determined and reproduction of each original area may or may not be in a location corresponding to its location on the original. For example, the reproduced image may be reversed with respect to the original image, may be rotated, may be reversed, etc. As is known in the art, the reproducing means 121 and 123 under the control of the processor 109, can alter the order of the original image areas as reproduced on the imaging surface 127.

Programs written for the Signetics 8X300 for using the inventive principles according to the description of the preferred embodiment are included in the Appendix.

APPENDIX

```
PROG SDE                         MICROCONTROLLER CROSS ASSEMBLER VER 1.1
                 ************************************************
                 * SYMBOLIC NAME      ... PLC
                 * PURPOSE            ... TO PROCESS THE NEXT FOUR
                 *                        LOCATIONS IN THE I/P BUFFER
                 *                        AS A LINEWORK CHARACTER
                 * CALLING SEQUENCE   ... JMP PLC
                 * ENTRY PARAMETERS   ... I/P BUFFER POINTS TO THE
                 *                        CORRECT LOCATIONS.
                 * EXIT PARAMETERS    ... CHAR IS IN R5
                 * CALLS TO           ... /
                 * COMMENTS           ... PERFORMS A FOURIER TRANSFORM
                 *                        ON THE FOUR VALUES AND USES
                 *                        RESULT TO CODE AN 8-ANGLE
                 *                        LINEWORK CHARACTER
                 ************************************************
   010 0 1      VZFLAG LIV CIP1,0         V IS NEGATIVE
   010 1 1      VMFLAG LIV CIP1,1         V IS INSIDE THRESHOLD
   010 2 1      TZFLAG LIV CIP1,2         T IS NEGATIVE
   010 3 1      TMFLAG LIV CIP1,3         T IS INSIDE THRESHOLD
   010 4 1      AZFLAG LIV CIP1,4         A IS NON-ZERO
   010 5 1      BZFLAG LIV CIP1,5         B IS NON-ZERO
   010 6 1      CZFLAG LIV CIP1,6         C IS NON-ZERO
   010 7 1      DZFLAG LIV CIP1,7         D IS NON-ZERO
   010 3 4      THFLGS LIV CIP1,3,4    THRESHOLD FLAGS
   010 7 4      ZFLGS  LIV CIP1,7,4    ZERO FLAGS
                 *
```

```
                    * USE OF REGISTERS
                    * AUX     GENERAL PURPOSE
                    * R1      S    )
                    * R2      T    )   VALUES PRODUCED BY
                    * R3      U    )   TRANSFORM CODING
                    * R4      V    )
                    * R5      USED FOR INVERTING DATA
                    * R6      TEMP FLAGS STORE
                    ****************************
                    * PERFORM TRANSFORM CODING
                    * AND CHECK FOR ZEROS
                    ****************************
                    *
                    ***************
                    * SET UP FLAGS REGISTER
03175   6 17001     PLC     SEL IBDATA
03176   6 07010             SEL CIP1
03177   6 06000             XMIT 0,R6   USED TO CLEAR MEMORY AFTER WRITE
03200   6 05377             XMIT -1,R5  USED FOR INVERTING DATA
03201   0 05027             MOVE R5,CIP1
                    ***************
                    * INPUT A
03202   0 37000             MOVE IBDATA,AUX
03203   0 06037             MOVE R6,IBDATA
                    ***************
                    * 'IF' A ZERO CLEAR AZ FLAG
03204   5 00206             NZT AUX,*+2
03205   6 24100             XMIT 0,AZFLAG
                    ***************
                    * 'ENDIF'
                    * PUT A INTO S,T,U AND V
03206   0 00001             MOVE AUX,R1
03207   0 00002             MOVE AUX,R2
03210   0 00003             MOVE AUX,R3
03211   0 00004             MOVE AUX,R4
                    ***************
                    * INPUT D
03212   0 37000             MOVE IBDATA,AUX
03213   0 06037             MOVE R6,IBDATA
                    ***************
                    * 'IF' D ZERO
                    *    CLEAR DZ FLAG
03214   5 00217             NZT AUX,*+3
03215   6 27100             XMIT 0,DZFLAG
03216   7 03225             JMP *+7
                    ***************
                    * 'ELSE'
                    *    ADD INTO S AND T
03217   1 01001             ADD R1,R1
03220   1 02002             ADD R2,R2
                    *    TAKE TWO'S COMPLEMENT
03221   1 05000             ADD R5,AUX
03222   3 05000             XOR R5,AUX
                    *    ADD INTO U AND V
03223   1 03003             ADD R3,R3
03224   1 04004             ADD R4,R4
                    *******************
                    * INPUT C
03225   0 37000             MOVE IBDATA,AUX
03226   0 06037             MOVE R6,IBDATA
                    ***************
                    * 'ENDIF'
                    * 'IF' C IS ZERO
                    *    CLEAR CZ FLAG
03227   5 00232             NZT AUX,*+3
03230   6 26100             XMIT 0,CZFLAG
03231   7 03240             JMP *+7
                    * 'ELSE'
                    *    ADD INTO S AND U
03232   1 01001             ADD R1,R1
03233   1 03003             ADD R3,R3
                    *    TAKE TWO'S COMPLEMENT
03234   1 05000             ADD R5,AUX
```

```
03235  3 05000           XOR  R5,AUX
                  *   ADD TO T AND V
03236  1 02002           ADD  R2,R2
03237  1 04004           ADD  R4,R4
                  *  'ENDIF'
                  **************
                  *  INPUT B
03240  0 37000           MOVE IBDATA,AUX
03241  0 06037           MOVE R6,IBDATA  CLEAR MEMORY
                  *  'IF' B IS ZERO
                  *    CLEAR BZ FLAG
03242  5 00245           NZT  AUX,*+3
03243  6 25100           XMIT 0,BZFLAG
03244  7 03253           JMP  *+7
                  *  'ELSE'
                  *    ADD TO S AND V
03245  1 01001           ADD  R1,R1
03246  1 04004           ADD  R4,R4
                  *    TAKE TWO'S COMPLEMENT
03247  1 05000           ADD  R5,AUX
03250  3 05000           XOR  R5,AUX
                  *    ADD TO T AND U
03251  1 02002           ADD  R2,R2
03252  1 03003           ADD  R3,R3
                  *  'ENDIF'
                  *  CLEAR R5
03253  6 05000           XMIT 0,R5
                  *******************************
                  *  'IF' S>110 CODE BLACK CHARACTER
03254  6 00222           XMIT -110,AUX
03255  1 01000           ADD  R1,AUX
                         ORG  3,256
03256  5 10260           NZT  OVF,*+2
03257  7 03262           JMP  ZTEST
03260  6 05017           XMIT 17H,R5
03261  7 03711           JMP  OUT
                  *******************************************
                  *
                  *
                  *  TEST FOR NO. OF ZEROS
                  *  FLAGS ARE SET UP ON IV BYTE
                  *
                  *  NO. OF ZEROS        ACTION
                  *      4               O/P BLANK
                  *      3               PERFORM Z3 -CODE ONE OF THE CORN
                  *      2 IN OPP CORNERS PERFORM Z2OPP
                  *      2 ADJACENT
                  *      1 OR ZERO       PERFORM TVTEST TO FIND CHAR.
                  *
                  *
                         ORG  19,256
       27406      ZTEST  MOVE ZFLGS,R6  PUT FLAGS IN R6
       06264            XEC  *+1(R6)
       03705            JMP  WHITE     0000 ALL ZEROS
       03474            JMP  Z3        0001 3 ZEROS
       03474            JMP  Z3        0010 3 ZEROS
       03304            JMP  TVTEST    0011 2 ADJ ZEROS
       03474            JMP  Z3        0100 3 ZEROS
       03546            JMP  Z2OPP     0101 2 OPP ZEROS
       03304            JMP  TVTEST    0110 2 ADJ ZEROS
       03304            JMP  TVTEST    0111 1 ZERO
       03474            JMP  Z3        1000 3 ZEROS
       03304            JMP  TVTEST    1001 2 ADJ ZEROS
       03546            JMP  Z2OPP     1010 2 OPP ZEROS
       03304            JMP  TVTEST    1011 1 ZERO
       03304            JMP  TVTEST    1100 2 ADJ ZEROS
       03304            JMP  TVTEST    1101 1 ZERO
       03304            JMP  TVTEST    1110 1 ZERO
       03304            JMP  TVTEST    1111 NO ZEROS
                  *******************************************
                  *
                  *
                  *  TV TEST.
```

```
                    * TEST T AND V FOR LIMITS AND CODE CHARACTER.
                    * IF BOTH T AND V ARE BOTH WITHIN LIMITS
                    * THEN EITHER S (MAGNITUDE) IS TOO LOW (<14)
                    * OR THE CHAR IS CENTRAL. IN BOTH THESE CASES
                    * FURTHER TESTING IS NEEDED AND THIS ROUTINE EXITS
                    * TO UTEST TO TEST U
                    *
                    *
                    * SET UP SIGN AND MAGNITUDE FLAGS FOR
                    * T AND V
                    * THE FIRST 4 BITS OF LBD ARE USED FOR THIS
                    *    BIT         FUNCTION      SET IF
                    *    0(MSB)      VZ FLAG       V IS NEGATIVE
                    *    1           VM FLAG       V IS OUTSIDE THRESHOLD
                    *    2           TZ FLAG       T IS NEGATIVE
                    *    3           TM FLAG       T IS OUTSIDE THRESHOLD
                    *
                    *
03304  6 00001      TVTEST  XMIT 1,AUX
                    * TEST SIGN BIT OF T
03305  2 02705              AND R2(7),R5
03306  5 05310              NZT R5,*+2   SIGN BIT SET?
03307  6 22100              XMIT 0,TZFLAG,1  NO -RESET TZ FLAG
                    * TEST SIGN BIT OF V
03310  2 04705              AND R4(7),R5
03311  5 05313              NZT R5,*+2     SIGN BIT SET?
03312  6 20100              XMIT 0,VZFLAG,1  NO -RESET VZ FLAG
                    * TEST FOR THRESHOLDS
03313  6 00016              XMIT 14,AUX
03314  1 02002              ADD R2,R2      ADD 14 TO T
03315  1 04004              ADD R4,R4      ADD 14 TO V
03316  6 00344              XMIT -28,AUX
                    * TEST T
03317  1 02002              ADD R2,R2      SUBTRACT 28 FROM T
03320  5 10322              NZT OVF,*+2    OVERFLOW MEANS OUTSIDE THRESHO
03321  6 23100              XMIT 0,TMFLAG,1 INSIDE -CLEAR TM FLAG
                    * TEST V
03322  1 04004              ADD R4,R4      SUBTRACT 28 FROM V
03323  5 10325              NZT OVF,*+2    OVERFLOW =OUTSIDE THRESHOLD
03324  6 21100              XMIT 0,VMFLAG  INSIDE -CLEAR VM FLAG
                    * MOVE FLAGS TO R6
03325  0 23406              MOVE THFLGS,R6
                    *****************************************
                    * FLAGS ARE ALL SET
                    * JUMP TO CORRECT ANGLE ROUTINE
                    * CHARACTER CAN BE EITHER
                    * 0,90 ETC. I.E. VERT CHARACTER
                    * 45,135 ETC. I.E. DIAG CHARACTER
                    * OR UNKNOWN IF BOTH T AND V ARE IN THRESHOLD
                    * IN THIS CASE JUMP TO UTEST
                    * THE CHARACTERS ARE SPLIT INTO VERTICAL
                    * AND HORIZONTAL CHARS BECAUSE DIFFERENT
                    * THRESHOLDS APPLY ON THE MAGNITUDE S TO
                    * PRODUCE THE CORRECT CHARACTERS
                    *
                            ORG 18,256
                    * JUMP TO CORRECT ROUTINE
03326  4 06327              XEC *+1(R6)   THRESHOLD FLAGS ARE IN R6
03327  7 03625              JMP UTEST  0000 BOTH INSIDE THRESHOLD TEST U
03330  7 03446              JMP DIAG   0001 315 DEGREES
03331  7 03625              JMP UTEST  0010 INSIDE THRESHOLDS TEST U
03332  7 03446              JMP DIAG   0011 135 DEGREES
03333  7 03446              JMP DIAG   0100 45 DEGREES
03334  7 03400              JMP VERT   0101 0 DEGREES
03335  7 03446              JMP DIAG   0110 45 DEGREES
03336  7 03400              JMP VERT   0111 90 DEGREES
03337  7 03625              JMP UTEST  1000 INSIDE THRESHOLDS TEST U
03340  7 03446              JMP DIAG   1001 315 DEGREES
03341  7 03625              JMP UTEST  1010 INSIDE THRESHOLDS TEST U
03342  7 03446              JMP DIAG   1011 135 DEGREES
03343  7 03446              JMP DIAG   1100 225 DEGREES
03344  7 03400              JMP VERT   1101 270 DEGREES
03345  7 03446              JMP DIAG   1110 225 DEGREES
03346  7 03400              JMP VERT   1111 180 DEGREES
```

```
                    *****************************************
                    *
                    * VERT -CHARACTER IS 0 DEGREE CHARACTER
                    *
                    * PICK UP ANGLE -BASIC CODE IS RETURNED IN R5
03347  7 03400            ORG 40,256
03400  4 06026      VERT  XEC ANGLE(R6)
                    * TEST MAGNITUDE OS S AGAINST THRESHOLDS
                    * THRESHOLDS SHOULD IDEALLY BE
                    * 8,26,50,78,102,118
                    * BUT IF WE LIMIT OURSELVES TO MULTIPLES
                    * OF 8 THEN THESE BECOME
                    * 8,24,48,80,104,110
                    * THUS BY DIVIDING BY 8 AND PICKING
                    * UP A VALUE FROM A TABLE
                    * WE SHOULD SIMPLIFY THE OPERATION
                    *
                    * DIVIDE S BY 8
03401  6 00017            XMIT 17H,AUX  ONLY ALLOW 4 BITS
03402  2 01300            AND R1(3),AUX
                    * PICK UP VALUE IN AUX
03403  4 00006            XEC VMAG(AUX)
                    * COMBINE WITH BASIC CODE AND EXIT
03404  1 05005            ADD R5,R5
03405  7 03711            JMP OUT
                    ****************************
                    *
                    * TABLE OF THRESHOLDS FOR 0 DEGREE CHARS
                    * VALUES ARE RETURNED IN THE     REGISTER
                    *
03406  7 03705      VMAG  JMP WHITE     <8 BLANK CHAR
03407  7 03705            JMP WHITE     <16
03410  7 03705            JMP WHITE
03411  6 00003            XMIT 3,AUX    <32
03412  6 00003            XMIT 3,AUX    <40
03413  6 00003            XMIT 3,AUX    <48
03414  6 00004            XMIT 4,AUX    <56
03415  6 00004            XMIT 4,AUX    <64
03416  6 00004            XMIT 4,AUX    <72
03417  6 00004            XMIT 4,AUX    <80
03420  6 00005            XMIT 5,AUX    <88
03421  6 00005            XMIT 5,AUX    <96
03422  6 00005            XMIT 5,AUX    <104
03423  6 00006            XMIT 6,AUX    <112
03424  6 00007            XMIT 7,AUX    <120
03425  7 03703            JMP BLACK     <128
                    ****************************
                    *
                    * TABLE OF ANGLES FOR VERT AND DIAG
                    * BASIC CHARACTER CODES ARE RETURNED IN R5
                    * THESE ONLY NEED A MAGNITUDE ADDED
                    * TO THEM TO PRODUCE THE FINAL CHAR
03426  7 03625      ANGLE JMP UTEST     0000
03427  6 05260            XMIT 260H,R5  0001 ANGLE =315
03430  7 03625            JMP UTEST     0010
03431  6 05160            XMIT 160H,R5  0011 ANGLE =135
03432  6 05120            XMIT 120H,R5  0100 ANGLE =45
03433  6 05100            XMIT 100H,R5  0101 ANGLE =0
03434  6 05120            XMIT 120H,R5  0110 ANGLE =45
03435  6 05140            XMIT 140H,R5  0111 ANGLE =90
03436  7 03625            JMP UTEST     1000
03437  6 05260            XMIT 260H,R5  1001 ANGLE =315
03440  7 03625            JMP UTEST     1010
03441  6 05160            XMIT 160H,R5  1011 ANGLE =135
03442  6 05220            XMIT 220H,R5  1100 ANGLE =225
03443  6 05240            XMIT 240H,R5  1101 ANGLE =270
03444  6 05220            XMIT 220H,R5  1110 ANGLE =225
03445  6 05200            XMIT 200H,R5  1111 ANGLE =180
                    *****************************************
                    *
                    * DIAG -CHARACTER IS 45 DEGREE CHARACTER
                    * GET ANGLE
03446  4 06026      DIAG  XEC ANGLE(R6) THRESHOLD FLAGS ARE IN R6
                    *
```

```
                    * THRESHOLDS FOR THE CHARS SHOULD BE
                    * 8,24,40,56,72,88,104
                    * DIVIDE BY 8 AND USE A TABLE FOR THE THRESHOLDS
03447  6 00017           XMIT 17H,AUX
03450  2 01300           AND R1(3),AUX
                         ORG 20,256
03451  4 00054           XEC DMAG(AUX)
03452  1 05005           ADD R5,R5
03453  7 03711           JMP OUT
                    *******************
                    * TABLE OF THRESHOLDS FOR 45 DEGREE CHARS
03454  7 03705     DMAG  JMP WHITE      <8
03455  7 03705           JMP WHITE      <16
03456  7 03705           JMP WHITE      <24
03457  6 00002           XMIT 2,AUX     <32
03460  6 00002           XMIT 2,AUX     <40
03461  6 00003           XMIT 3,AUX     <48
03462  6 00003           XMIT 3,AUX     <56
03463  6 00004           XMIT 4,AUX     <64
03464  6 00004           XMIT 4,AUX     <72
03465  6 00005           XMIT 5,AUX     <80
03466  6 00005           XMIT 5,AUX     <88
03467  6 00006           XMIT 6,AUX     <96
03470  6 00006           XMIT 6,AUX     <104
03471  6 00007           XMIT 7,AUX     <112
03472  6 00007           XMIT 7,AUX     <120
03473  7 03703           JMP BLACK      <128
                    ********************************
                    *
                    * Z3 -3 ZEROS FOUND
                    * CODE CHAR DEPENDING ON MAGNITUDE
                    * MAX POSSIBLE IS 32
                    * THUS IF WE DIVIDE BY 4 AND PICK THRESHOLDS
                    * FROM A TABLE THE MAX NO. OF VALUES WILL BE 9
                    *
                    * PICK UP BASIC CODE
                    * DEPENDING ON WHERE THE ZEROS ARE
03474  0 27400     Z3    MOVE ZFLGS,AUX
                         ORG 40,256
03475  4 00103           XEC Z3TAB(AUX)
                    *
                    * DIVIDE MAG BY 4
03476  6 00017           XMIT 17H,AUX
03477  2 01200           AND R1(2),AUX
                    * PICK UP CORRECT MAG AND EXIT
                    * OR JUMP TO ROUTINE TO GENERATE CORNER PIECE
                    * IF NECESSARY
03500  4 00123           XEC Z3MAG(AUX)
03501  1 05005           ADD R5,R5
03502  7 03711           JMP OUT
                    *
                    * TABLE OF BASIC CODES
                    * IF A COMBINATION WHICH SHOULD HAVE
                    * PREVIOUSLY BEEN PICKED UP IS FOUND
                    * A JUMP TO CHERR IS PERFORMED WHICH
                    * THEN CODES A BLANK
03503  7 03707     Z3TAB JMP CHERR       0000 IMPOSSIBLE
03504  6 05240           XMIT 240H,R5    0001 D NON-BLANK
03505  6 05200           XMIT 200H,R5    0010 C NON-BLANK
03506  7 03707           JMP CHERR       0011
03507  6 05140           XMIT 140H,R5    0100 B NON-BLANK
03510  7 03707           JMP CHERR       0101
03511  7 03707           JMP CHERR       0110
03512  7 03707           JMP CHERR       0111
03513  6 05100           XMIT 100H,R5    1000 A NON-BLANK
03514  7 03707           JMP CHERR       1001
03515  7 03707           JMP CHERR       1010
03516  7 03707           JMP CHERR       1011
03517  7 03707           JMP CHERR       1100
03520  7 03707           JMP CHERR       1101
03521  7 03707           JMP CHERR       1110
03522  7 03707           JMP CHERR       1111
                    ****************************
```

```
                        *
                        * MAGNITUDES FOR CHARS WITH 3 ZEROS
03523   7 03705         Z3MAG   JMP WHITE       0000    <4
03524   6 00001                 XMIT 1,AUX      0001    <8
03525   6 00001                 XMIT 1,AUX      0010    <12
03526   6 00002                 XMIT 2,AUX      0011    <16
03527   6 00002                 XMIT 2,AUX      0100    <20
03530   7 03543                 JMP CRNER3      0101    <24
03531   7 03543                 JMP CRNER3      0110    <28
03532   7 03543                 JMP CRNER3      0111    <32
03533   7 03543                 JMP CRNER3      1000    =32
03534   7 03543                 JMP CRNER3
03535   7 03543                 JMP CRNER3
03536   7 03543                 JMP CRNER3
03537   7 03543                 JMP CRNER3
03540   7 03543                 JMP CRNER3
03541   7 03543                 JMP CRNER3
03542   7 03543                 JMP CRNER3
                        *********************
                        * CORNER PIECE FOUND
                        * ROTATE BASIC CODE TO GET CORRECT PIECE
03543   6 00007         CRNER3  XMIT 7,AUX
03544   2 05505                 AND R5(5),R5
03545   7 03711                 JMP OUT
                        ***************************
                        * Z2OPP -2 ZEROS IN OPPPOSITE CORNERS
                        * THE CHARACTERS TO BE OUTPUT DEPEND ON THE
                        * MAGNITUDE (S)
                        * IF S<8   CODE WHITE
                        * IF S<20 CODE EITHER 316 OR 336
                        * IF S<36 CODE EITHER 314 OR 334
                        * IF S>36 CODE CORNER PIECE EITHER 6 OR 7
                        *
                        *
                        * DIVIDE BY 4 AND PICK UP CORRECT CODE
                        * FROM A TABLE
                        * SINCE THERE ARE TWO ZEROS
                        * THE MAX POSSIBLE VALUE IS
                        * 64, THUS AFTER DIVIDING BY 4
                        * MAX NO OF VALUES =17
                        *
                        *DIVIDE BY 4
                           ORG 42,256
03546   6 00037         Z2OPP   XMIT 37H,AUX
03547   2 01200                 AND R1(2),AUX
                        * PICK UP VALUE
                        * IF PIECE IS A CORNER PIECE PROG
                        * WILL JUMP TO CORNER2 HERE
03550   4 00160                 XEC Z2TAB(AUX)
                        * TEST IF A IS ZERO
03551   5 24115                 NZT AZFLAG,*+4
                        * YES -THUS CHAR IS 334 OR 336 CODE AND EXIT
03552   6 00334                 XMIT 334H,AUX
03553   1 05005                 ADD R5,R5
03554   7 03711                 JMP OUT
                        * NO -THUS CHAR IS 314 OR 316 -CODE AND EXIT
03555   6 00314                 XMIT 314H,AUX
03556   1 05005                 ADD R5,R5
03557   7 03711                 JMP OUT
                        ************************************
                        *
                        * TABLE OF VALUES FOR 2 ZEROS
                        * CODE IS RETURNED IN R5
                        * UNLESS WHITE OR CORNER PIECE
03560   7 03705         Z2TAB   JMP WHITE       0000    <4
03561   7 03705                 JMP WHITE       0001    <8
03562   6 05002                 XMIT 2,R5       0010    <12
03563   6 05002                 XMIT 2,R5       0011    <16
03564   6 05002                 XMIT 2,R5       0100    <20
03565   6 05000                 XMIT 0,R5       0101    <24
03566   6 05000                 XMIT 0,R5       0110    <28
03567   6 05000                 XMIT 0,R5       0111    <32
03570   6 05000                 XMIT 0,R5       1000    <36
```

```
03571  7 03620              JMP CRNER2  1001    <40
03572  7 03620              JMP CRNER2  1010    <44
03573  7 03620              JMP CRNER2  1011    <48
03574  7 03620              JMP CRNER2  1100    <52
03575  7 03620              JMP CRNER2  1101    <56
03576  7 03620              JMP CRNER2  1110    <60
03577  7 03620              JMP CRNER2  1111    <64
03600  7 03620              JMP CRNER2  10000   =64
03601  7 03707              JMP CHERR
03602  7 03707              JMP CHERR
03603  7 03707              JMP CHERR
03604  7 03707              JMP CHERR
03605  7 03707              JMP CHERR
03606  7 03707              JMP CHERR
03607  7 03707              JMP CHERR
03610  7 03707              JMP CHERR
03611  7 03707              JMP CHERR
03612  7 03707              JMP CHERR
03613  7 03707              JMP CHERR
03614  7 03707              JMP CHERR
03615  7 03707              JMP CHERR
03616  7 03707              JMP CHERR
03617  7 03707              JMP CHERR
                     *******************
                     * CORNER PIECE FOUND
                     * TEST A
03620  5 24124       CRNER2 NZT AZFLAG,*+4
                     * A ZERO CODE =7
03621  6 05007              XMIT 7,R5
03622  7 03711              JMP OUT
                     * A NON ZERO CODE =6
03623  6 05006              XMIT 6,R5
03624  7 03711              JMP OUT
                     ******************************************
                     * UTEST
                     * CODING FAILED OR CHARACTER TOO CENTRAL
                     * TEST MAGNITUDE OF U
                         ORG 47,256
03625  6 00016       UTEST  XMIT 14,AUX
03626  1 03003              ADD R3,R3   ADD THRESHOLD TO U
03627  6 00344              XMIT -28,AUX
03630  1 03003              ADD R3,R3   SUBTRACT TWICE THRESHOLD
03631  5 10240              NZT OVF,UT2 JMP IF OUTSIDE THRESHOLD
                     * INSIDE THRESHOLD TEST MAGNITUDE OF S
03632  6 00300              XMIT -64,AUX
03633  1 01000              ADD R1,AUX
03634  4 10236              XEC *+2(OVF)
03635  7 03711              JMP OUT    EXIT WITH CODE
03636  6 05000              XMIT 0,R5     <64 CODE WHITE
03637  6 05017              XMIT 17H,R5   >64 CODE BLACK
                     * TEST S TO FIND CHAR
03640  6 00017       UT2    XMIT 17H,AUX  SET MASK
03641  2 01300              AND R1(3),AUX  DIVIDE S BY 8
03642  4 00263              XEC UTAB(AUX)  CODE AS VERT CHAR
                     * BLACK-ON-WHITE OR WHITE-ON-BLACK?
03643  6 00010              XMIT 8,AUX  PUT MASK IN PLACE TO CHANGE CHAR
03644  2 03400              AND R3(4),AUX  PUT SIGN BIT THERE
03645  1 05005              ADD R5,R5       AND ADD TO FINAL CHAR
                     * WAS PREVIOUS CHAR >C0 ?
03646  6 07005              SEL LBD
03647  6 00077              XMIT 77H,AUX
03650  1 27000              ADD LBD,AUX
03651  5 10253              NZT OVF,*+2 JMP IF >C0
03652  7 03711              JMP OUT      OTHERWISE EXIT
                     * WAS IT >D0 ?
03653  6 00057              XMIT 57H,AUX
03654  1 27000              ADD LBD,AUX   TEST FOR >D0
03655  6 00030              XMIT 11000B,AUX SET BITS TO CHANGE V TO H
03656  4 10257              XEC *+1(OVF) EXECUTE *+2 IF >D0
03657  7 03661              JMP *+2
03660  3 27027              XOR LBD,LBD   CHANGE OLD CHAR TO HORIZ.
03661  3 05005              XOR R5,R5     CHANGE NEW CHAR TO HORIZ.
03662  7 03711              JMP OUT
```

```
                        * TABLE OF VALUES FOR HORIZONTAL/VERTICAL CHARS
03663  7 03705     UTAB   JMP  WHITE         <8
03664  7 03705            JMP  WHITE         <16
03665  6 05322            XMIT 322H,R5       <24
03666  6 05322            XMIT 322H,R5       <32
03667  6 05322            XMIT 322H,R5       <40
03670  6 05322            XMIT 322H,R5       <48
03671  6 05324            XMIT 324H,R5       <56
03672  6 05324            XMIT 324H,R5       <64
03673  6 05324            XMIT 324H,R5       <72
03674  6 05324            XMIT 324H,R5       <80
03675  6 05326            XMIT 326H,R5       <88
03676  6 05326            XMIT 326H,R5       <96
03677  6 05326            XMIT 326H,R5       <104
03700  6 05326            XMIT 326H,R5       <112
03701  7 03703            JMP  BLACK         <120
03702  7 03703            JMP  BLACK         <128
                    *************************
                    * BLACK -MAG >114 SO CODE BLACK
03703  6 05017     BLACK  XMIT 17H,R5
03704  7 03711            JMP  OUT
                    ******************************
                    * WHITE -MAG <14 OR UNCODEABLE SO CODE WHITE
03705  6 05000     WHITE  XMIT 0,R5
03706  7 03711            JMP  OUT
                    **********************
                    * CHERR -ERROR FOUND WHEN DECIDING NO. OF ZEROS
                    * CODE WHITE
03707  6 05000     CHERR  XMIT 0,R5
03710  7 03711            JMP  OUT
                    **********************
                    * CHAR IS CODED IN R5 SO RETURN
03711  6 06000     OUT    XMIT 0,R6   CLEAR R6
03712  7 03117            JMP  PLCRET
                           END  PLW1
```

What is claimed is:

1. A method of encoding the information in a scanned original comprising the steps of:
producing signals indicative of the information in said original;
quantizing said signals according to the values of elements within a stored pattern, for at least a part of said original;
weighting the said quantized signals for separate subareas of the said pattern by combining the said quantized signals to form weighted values representing the original information for each said subarea and combining the said weighted values according to a predetermined function to produce an encoded signal indicative of the modulated distribution of said information over said subareas of said pattern.

2. The method of claim 1, where said step of producing said encoded signal includes the step of producing an encoded signal indicating the amount of said information and the angularity of said information over the said pattern.

3. The method of claim 1 wherein said pattern subareas includes adjacent and opposite subareas, said predetermined function includes first and second functions, said step of combining weighted values includes the step of combining weighted values for opposite sets of subareas according to said first and second functions to form first and second functional values comparing said first and second functional values to a threshold to determine the symmetry of the information in the said pattern, combining the said weighted values according to a third function to determine the amount of information in said pattern and producing a first binary word indicative of the amount of information in said pattern.

4. The method of claim 1, where said predetermined function includes first and second functions, said pattern subareas includes adjacent and opposite subareas and said step of combining said weighted values includes the step of combining the weighted values from at least first and second adjacent subareas according to first and second functions, to produce first and second results, said first and second functions being separate and distinct and comparing the said first and second results to determine the said angularity.

5. The method of claim 4, where said step of comparing the said first and second results to determine the angularity includes the step of comparing the said first and second results to a threshold value to determine the angularity of said information with respect to a reference angle in said pattern.

6. The method of claim 4, wherein said step of combining weighted values includes the step of combining weighted values for opposite sets of subareas in said pattern to form first and second functional values, comparing said functional value to a threshold to determine the symmetry of the information in the said dot pattern, combining the said weighted values according to a third function to determine the amount of information in said pattern and producing a first binary word indicative of the angle of symmetry and a second binary word indicative of the amount of information in said dot pattern.

7. The method of claim 1, where the said function includes first and second functions, the said step of combining the said weighted values for the said subareas includes the step of combining the weighted subarea values according to said first function, combining the weighted subarea values according to said second function, said combined values having a maximum and minimum depending upon the angularity of said information relative to said stored pattern, and comparing said combined values to a threshold indicative of angularity and determining from said comparison said angularity.

8. The method of claim 7, where said step of combining includes the step of combining said weighted values for said pattern according to said first function and forming a first functional value, combining the said weighted values according to said second function to form a second functional value, said step of comparing includes the step of comparing the relationship of said functional values to said threshold and producing a set of logic signals having states indicative of said angularity, and encoding said logic signals to define said angularity.

9. The method of claim 7, where the step of comparing the said combined values to a threshold value includes the step of establishing additional threshold values to increase the resolution of said step of comparison and said angularity.

10. The method of claim 8, where said step of comparing includes the step of comparing the said first and second functional values to at least first and second thresholds, and producing at least a plurality of logic signals responsive to said step of comparing and producing a first logic signal having a first logic state responsive to the first functional value being on a first side of a first threshold and a second logic state responsive to said first functional value being on the second side of said first threshold, producing a second logic signal having a first state responsive to said first functional value being on a first side of said second threshold and a second logic state responsive to said first functional value being on the second side of said second threshold, producing a third logic signal having a first state responsive to said second functional value being on the first side of said first threshold and a second state responsive to said second functional value being on a second side of said first threshold and producing a fourth logic signal having a first state responsive to said second functional value being on the first side of said second threshold and having a second state responsive to said second functional value being on the second side of said first threshold.

11. A method for scanning and reproducing an original comprising the steps of scanning said original, and (a) producing a video signal indicative of the information on the original, (b) comparing said video for said original with a screen dot pattern to produce a series of quantized signals indicative of the information content of said original, (c) combining the said quantized signals to form weighted values for subareas within the screen dot pattern, (d) establishing a plurality of threshold values related to the maximum combined quantized signal value for a subarea, (e) forming a first functional value by combining the weighted values of said subareas according to a first function, forming a second functional value by combining the weighted values for said subareas according to a second function, said first and second functional values changing responsively to the modulated angular distribution of said information within said screen dot pattern, (f) comparing said first and second functional values to said thresholds and producing a first logic signal having a first state when said first functional value is on a first side of a first of said thresholds and a second state when said first functional value is on a second side of said first threshold producing a second logic signal having a first state when said first functional value is on a first side of a second of said thresholds and a second state when said first functional value is on a second side of said threshold, producing a third logic signal having a first state when said second functional value is on said first side of said first threshold and a second logic state when said second functional value is on said second side of said first threshold and producing a fourth signal having a first logic state when said second functional value is on said first side of said second threshold and a second logic state when said second functional value is on said second side of first threshold, encoding the states of said first, second, third, and fourth logic signals into a signal indicative of the angular distribution of said information over said pattern, combining said weighted subarea values to form an encoded signal indicative of the modulated amount of information in the said pattern, storing a plurality of screen dot patterns representing said modulated angular distribution and amount of information, accessing a stored screen dot pattern responsive to said encoded signals, said screen dot pattern being substantially that of said modulated angular distribution and modulated amount of information over said pattern, and reproducing said accessed screen dot pattern.

12. A method of encoding and reproducing graphic halftone information contained in an original comprising the steps of;

(a) producing signals indicative of the information in separate areas of said original, (b) quantizing said signals according to the values of elements within a stored pattern, for at least a portion of said original, (c) weighting the said quantized signals for separate subareas of the said pattern by combining the said quantized signals for said separate subareas to form values representing the original information for each subarea and combining the said weighted values according to a predetermined function to produce an indication of the modulated distribution of the said information over said subareas of said pattern, (d) storing a plurality of halftone patterns, (e) selecting a stored halftone pattern having a modulated information distribution related to said indication, (f) reproducing said stored pattern.

13. A system for encoding and reproducing graphic halftone information contained in an original comprising, (a) means for producing signals indicative of the information in separate areas of said original, (b) means for quantizing said signals according to the values of elemental areas within a stored pattern for at least a portion of said original, (c) means for weighting the said quantized signals for separate subareas of the said pattern by combining the said quantized signals to form values representing the original information for each subarea and, (d) means for combining the said weighted values according to a predetermined function to produce an indication of the modulated distribution of the said information over said pattern.

14. The system of claim 13 where said means for combining to produce an indication of the modulated distribution of the said information over said pattern, produces an indication of the amount of said information and angularity of said information.

15. The system of claim 13 where said means for combining the said weighted values for the said subareas includes the means for combining the weighted subarea values according to a first function, and combining said subarea values according to a second function, said first and second functions having a maximum and minimum depending upon the angularity of said information relative to said pattern, and means for comparing the said combined values to a threshold indicative of angularity to determine said angularity.

16. The system of claim 13 where said means for combining said weighted values includes means for combining the weighted values for at least first and second adjacent subareas according to a first function and first and second adjacent subareas according to a second function, said first and second functions being separate and distinct and means for comparing the results of said first and second functions to indicate said angularity.

17. The system of claim 15 where said means for comparing to determine the angularity includes means for comparing the results of said first and second functions to a threshold value to determine the angularity of said information with respect to a reference angle in said pattern.

18. The system of claim 15 where said means for indicating the angularity of said information includes means for adding the weighted values of a first adjacent subarea and subtracting the weighted values of a second adjacent subarea and an opposite subarea from the weighted values of a selected subarea in said pattern according to a first function to produce a first result and adding the weighted values of said second adjacent subarea and subtracting the weighted values of said first adjacent subarea and said opposite subarea from the weighted values of said selected subarea, according to a second function to produce a second result and said means for comparing said first and second results to determine the angle of said information with respect to a reference angle.

* * * * *

UNITED STATES PATENT AND TRADEMARK OFFICE
CERTIFICATE OF CORRECTION

PATENT NO. : 4,447,831
DATED : May 8, 1984
INVENTOR(S) : David E. Adsett

It is certified that error appears in the above-identified patent and that said Letters Patent is hereby corrected as shown below:

```
In Claim 10, line 51, delete "first" and insert
therefore --second--.
```

Signed and Sealed this

Twelfth Day of February 1985

[SEAL]

Attest:

DONALD J. QUIGG

Attesting Officer

Acting Commissioner of Patents and Trademarks